United States Patent [19]
Coleman et al.

[11] 3,714,509
[45] Jan. 30, 1973

[54] INERTIA WELDER SPEED CONTROL DEVICE

[75] Inventors: Donald F. Coleman, Dunlap; Robert G. Miller, Metamora, both of Ill.

[73] Assignee: Production Technology Inc., Peoria, Ill.

[22] Filed: May 7, 1971

[21] Appl. No.: 141,230

Related U.S. Application Data

[63] Continuation-in-part of Ser. No. 791,440, Jan. 15, 1969, abandoned.

[52] U.S. Cl. ................................................317/5
[51] Int. Cl. ...............................................G01p 3/48
[58] Field of Search...........................................317/5

[56] References Cited

UNITED STATES PATENTS 3,560,854   2/1971   Moss et al. ..............................317/5

Primary Examiner—D. F. Duggan
Assistant Examiner—Harry E. Moose, Jr.
Attorney—Charles M. Fryer et al.

[57] ABSTRACT

An inertia welder speed switch assembly in which a signal is sensed by a magnetic pickup and is then passed through a squaring amplifier, differentiator, monostable multivibrator, filter integrator, and a plurality of comparator amplifiers. In each of the comparator amplifiers, the signal is compared to a reference voltage and a relay is operated by the signal as it reaches the value of the reference voltage.

27 Claims, 3 Drawing Figures

PATENTED JAN 30 1973 3,714,509

INVENTORS
DONALD F. COLEMAN
ROBERT G. MILLER

BY
Fryer, Tjensvold, Feix, Phillips & Lempio
ATTORNEYS

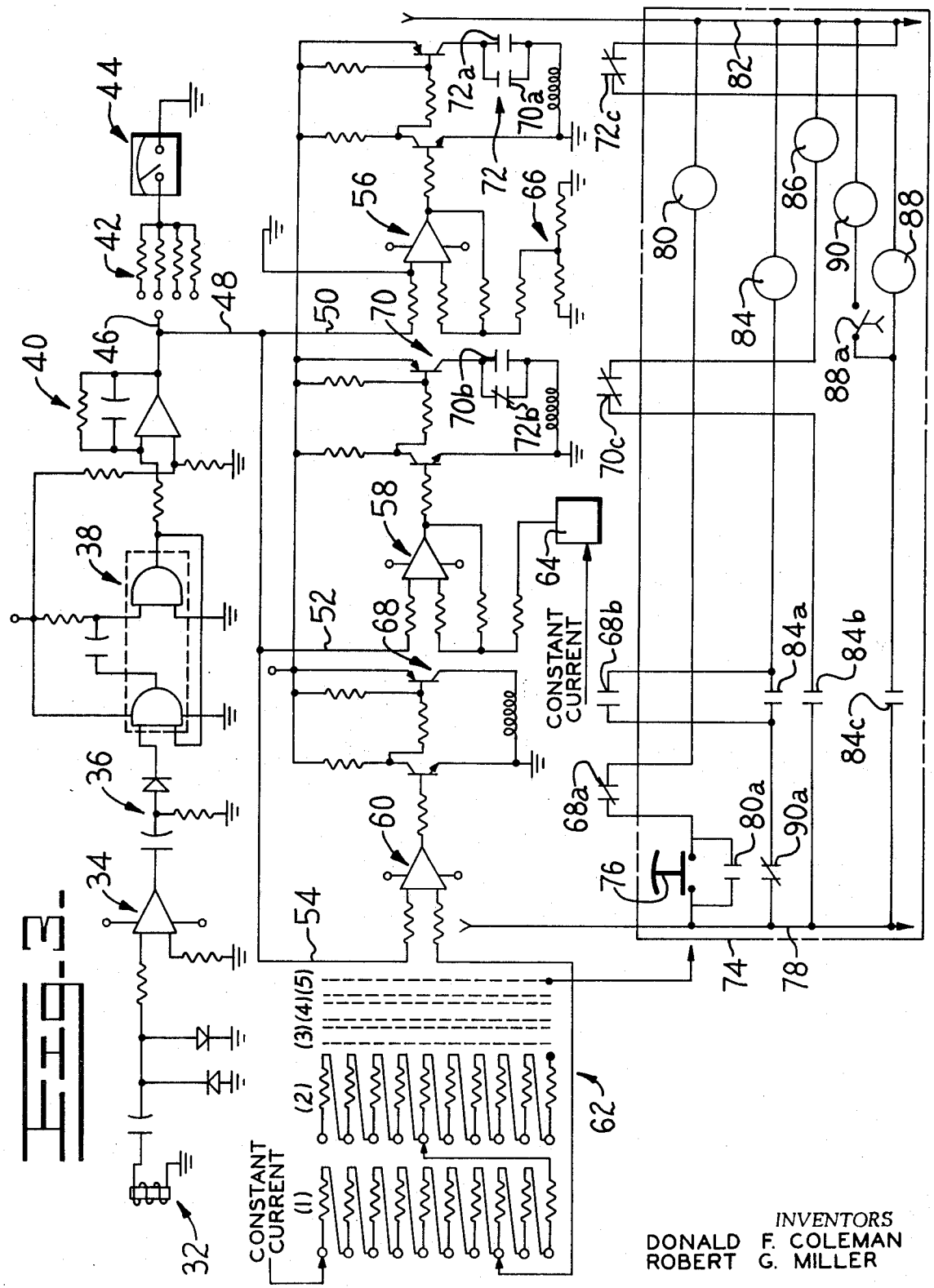

INERTIA WELDER SPEED CONTROL DEVICE

BACKGROUND AND SUMMARY OF THE INVENTION

This is a Continuation-in-Part of application Ser. No. 791,440, filed Jan. 15, 1969, and now abandoned.

This invention relates to a speed control device, and more specifically to speed monitoring and switching control for use with inertia welders of the type described in U.S. Pat. No. 3,273,233.

In obtaining consistent welds with inertia welders, the control of the machine functions of motor shutoff speed, initial ram pressure application, and second-stage ram pressure application is extremely important. If control of any of these functions is not reasonably precise, then the finished weld assembly will vary accordingly since weld quality is directly related to such machine parameters. Obtaining good welds with the inertia welding process assumes that close control of the machine functions which indirectly determine the welding parameters is possible. Close control of such functions is also essential if the welding machine is to function in a dependable and economical manner.

If flywheel spindle speed and/or ram pressure is allowed to drift higher than the desired value, then energy is wasted and it forms excess flash. On the other hand, if the speed of the flywheel spindle system and/or the value of the ram pressure is allowed to drop below desired values, then insufficient flashing will occur with resultant poor welds.

Most of the present production inertia welding machines use a speed control assembly having a magnetic pickup, with related power and electronic equipment, to sense a signal from a rotating spindle and send the signal to an optical meter relay. Actuation of the various machine functions is initiated by this meter relay when the light path between the lamp and the photocell is interrupted at a predetermined point on the meter by the meter indicator. This particular type of switching arrangement has an inherent time lag between actual machine speed and the meter indicated speed. This time lag, in turn, increases the weld cycle time and makes close control of machine functions extremely difficult.

It is, therefore, an object of this invention to produce a speed switch assembly which provides accurate control of machine functions.

It is also an object hereof to provide a speed switch and control assembly which will monitor the speed of a rotating spindle and activate certain machine functions at preselected speeds of rotation.

It is also an object of this invention to provide such an assembly which produces initiation of machine functions in response to an electrical signal.

It is a further object of this invention to provide such an assembly which takes a pulse from a magnetic pickup mechanism, amplifies it, and sends it through various electronic equipment to produce a voltage flow which is a direct function of the pulses received over a finite period of time by the magnetic pickup.

It is a still further object of this invention to provide such an assembly which utilizes comparator amplifiers to compare a DC voltage with preset reference voltages and activates relays when the DC voltage reaches the values of the programmed voltages.

It is also an object hereof to provide such an assembly which activates inertia weld machine functions in response to an electrical voltage which is a function of the speed of the machine spindle rotation.

It is also an object of this invention to provide relay logic which prevents actuation of relays controlling machine functions when speed is increasing and allows actuation when speed is decreasing.

It is also an object hereof to provide such an assembly which eliminates most of the time lag between sensing of machine rotation and actuation of machine functions.

It is a still further object hereof to provide such an assembly which is relatively reliable and trouble free, improves machine response, improves weld consistency, and produces shorter weld cycles, resulting in less wear on machine components.

Other objects and advantages of the present invention will become apparent from the following description and claims as illustrated in the accompanying drawings which, by way of illustration, show a preferred embodiment of the present invention and principles thereof and what is now considered to be the best mode contemplated for applying these principles. It is recognized that other embodiments of the invention utilizing the same or equivalent principles may be used, and structural changes may be made as desired by those skilled in the art, without departing from the present invention and purview of the appended claims.

BRIEF DESCRIPTION OF THE DRAWINGS

FIG. 3 is a schematic diagram of the speed switch assembly of the present invention.

DETAILED DESCRIPTION OF THE DRAWINGS

In the following description, the assembly of this invention will be described in an application for inertia welding machinery. Use of the subject assembly is not limited to such machinery and, in fact, it may be used in any type of rotary or spindle-driven equipment to control machinery functions.

Figure 1:
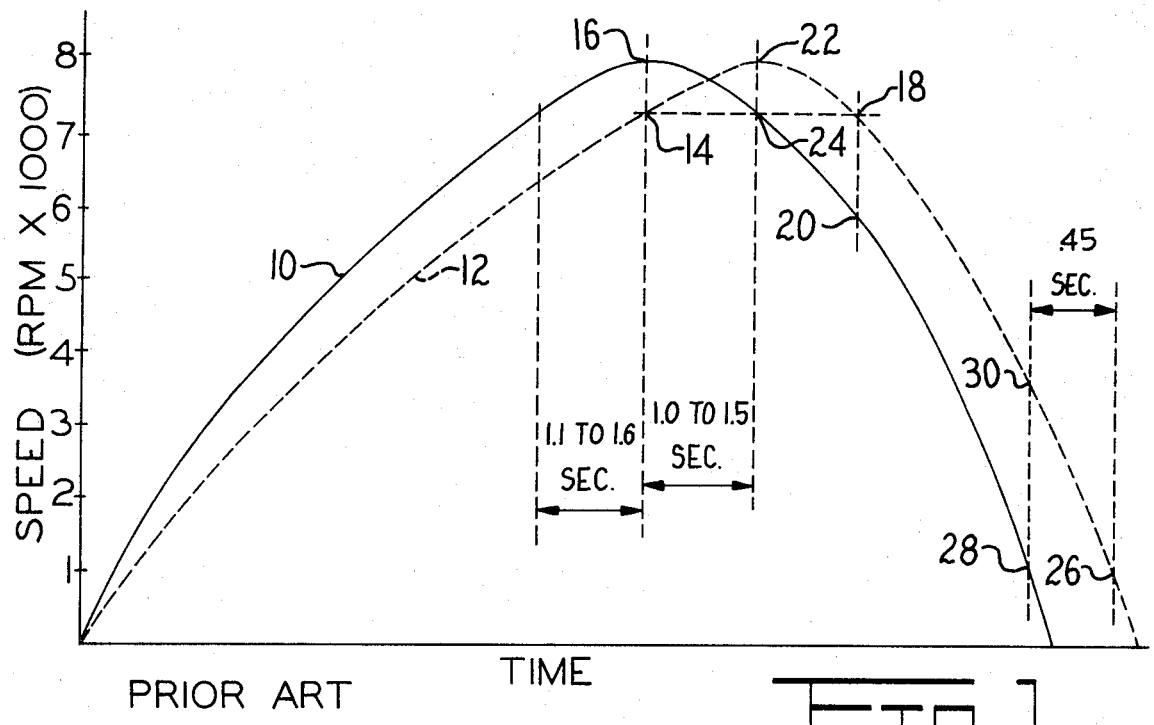
FIG. 1 is a simulated time-speed chart for a typical inertia weld on a machine controlled by presently available systems.

Referring now to the drawings in greater detail, FIG. 1 shows a simulated time-speed chart for a typical inertia weld made on a machine which is controlled by presently-available control assemblies. The solid trace 10 represents the actual machine speed and the dotted trace 12 represents the indicated speed as read on a meter. As can be seen, the meter speed reading lags behind the actual machine speed by a considerable amount, which amount increases as the acceleration of the spindle increases. On the dotted trace, point 14 represents the speed at which the motor of the machine is to be shut off and the weld cycle is to begin. If point 14 represented a true indication of machine speed, then initiation of the weld could begin immediately when the machine reaches this point and the motor is shut off. However, because of the time lag, which has been measured at between 1.1 and 1.6 seconds, when the meter has reached the indicated point 14, the machine has actually reached point 16, on the solid trace, which, in the case illustrated, represents approximately 8,000 rpm. Since the meter is lagging behind the actual machine speed, it will eventually register a reading of 8,000 rpm also.

It was initially believed that this late meter reading of 8,000 rpm was an overspeed of the coasting spindle system and was to be compensated for by deliberately allowing a lag time between actual motor shutoff, point 14, and application of the welding thrust force, point 18. However, by referring to the chart, when the meter speed reading drops to the level of point 18, which is the desired welding speed of 7,400 rpm, the actual speed, trace 10, will have dropped well below the desired welding speed as indicated by point 20.

Through experimentation, it was learned that if a time lag of between 1.0 and 1.5 seconds between motor shutoff, point 14, and ram pressure application, point 22, is preset on the controls, then the machine will be at approximately the correct welding speed when the meter is indicating the speed at point 22. This can be seen by referring to FIG. 1 and observing that point 22 on the meter speed trace 12 lies approximately directly above point 24 on the actual machine speed trace 10, and that point 24 is at approximately the desired welding speed of 7,400 rpm.

Further inconsistency of machine control is added when a two-step pressure application is desired for a particular weld piece. This second-stage pressure application, which is generally much higher than the first-stage application, is applied toward the end of the weld cycle when the spindle flywheel system is rapidly decelerating. In the case illustrated in FIG. 1, point 26 represents the desired speed, as shown on the meter, of 1,000 rpm, at which point the second-stage pressure application is to be applied. However, it can be seen from the graph that if point 26 is set on the meter indicator control, then the actual spindle speed, indicated by trace 10, will be zero at the time of the second-stage pressure application. The lag time at this point in the weld cycle is approximately 0.45 seconds, but because of the rapid deceleration of the spindle at this stage of the operation, even the smallest lag time is critical. Therefore, in order to apply the second-stage pressure application at the correct point, represented by 28 on trace 10, the value represented by point 30 on trace 12 must be set on the meter in the prior system. This reading is much higher than the actual desired value but, because of the inherent time lag of the meter indicator, the value 30 on the meter represents the approximate correct value, shown at point 28, of the spindle speed.

Thus, the above-described problem of the time lag between the meter speed reading and the actual machine speed causes a "guessing game" as to where to set the controls for the spindle speed on the meter. The time lag, which is a direct function of a particular sensing and control mechanism being used, makes it extremely difficult to acquire consistently good weld assemblies and also makes parameter determination more difficult.

Figure 2:
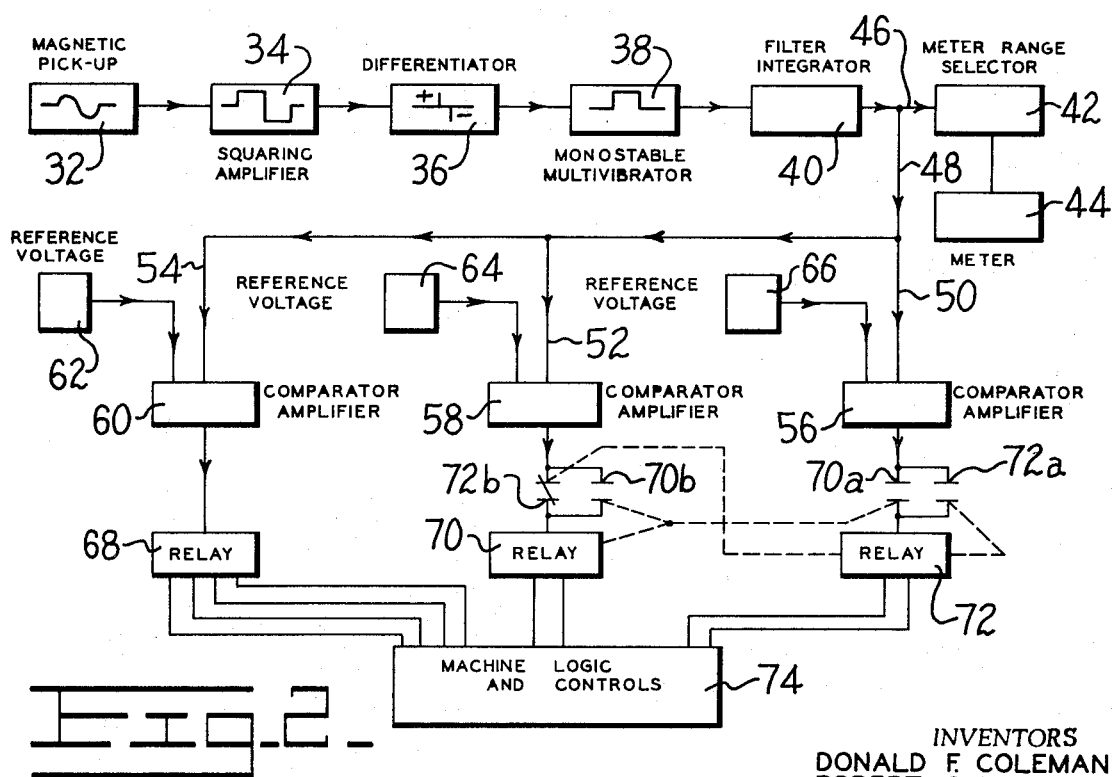
FIG. 2 is a block diagram of the speed switch assembly of the present invention.

The switch and control assembly, which is shown in a block diagram form in FIG. 2 and a schematic diagram in FIG. 3, is a far more efficient and reliable control system.

Precise control of the functions of the inertia welding machine can be accomplished by accurately determining the speed of the rotating system and initiating control of the machine function at a precise moment through the use of electrical impulses. The speed of the rotating spindle is sensed by the magnetic pickup or sensing means 32 which receives its signal from a 60-tooth gear attached to the rotating spindle. The output of the magnetic pickup is a sine wave, as shown in box 32 on the block diagram, and the sine wave is sent to a squaring amplifier 34 where it is amplified and changed to a square wave for each sine wave. From the squaring amplifier, the signal goes to a differentiator 36 where the square wave is differentiated to produce sharp, positive and negative pulses, as shown in the differentiator box 36. The positive pulse resulting from the differentiator 36 is sent to a monostable multivibrator 38, which produces a pulse of a fixed width and height while the negative pulse goes to ground.

The monostable multivibrator output is then sent to a filter integrator circuit 40, which is an integrated-circuit, operational amplifier with a resistance capacitance feedback loop. This circuit integrates the positive signal pulses over a fixed time period and produces a DC voltage level as a function of the frequency of the pulses received.

As the output signal leaves the filter integrator circuit, it takes two paths 46 and 48, with signal 46 going to the meter range selector 42 and signal 48 continuing on to take three separate paths 50, 52, and 54. The output of the meter range selector 42 goes to a meter 44 for a visual readout of the machine speed. This visual indication of the machine speed is used for operator reference only and does not exercise any control over machine functions, so that any time lag between the meter and actual machine operation is not important for efficient machine operation.

The signal on path 50 goes to a comparator amplifier 56, while the signal on path 52 goes to a comparator amplifier 58 and the signal on path 54 goes to a third comparator amplifier 60. A reference voltage mechanism 62 is connected to the comparator amplifier 60; a second reference voltage mechanism 64 is connected to comparator amplifier 58; a third reference voltage mechanism 66 is connected to the comparator amplifier 56. Each of the three comparator amplifiers is used to control a particular welding machine function and each compares the output signal of the filter integrator with their preset reference voltage.

When the output of the filter integrator exceeds one of the reference voltages, the output of the particular comparator amplifier changes state. This will energize one of the associated relays 68, 70 or 72, which will then activate electrical relays for actuation of each individual machine function of the inertia welder. Reference voltage mechanisms 62 and 64 are digivider/digidecade-type devices which have five-decade, ten-position capacity for accurate variation of the particular machine function which the comparator amplifier controls. The third reference voltage mechanism 66 is a nonvariable-type device since it needs to have only one set voltage which corresponds to 0 rpm of the machine spindle. This reference voltage mechanism 66 and the associated comparator amplifier 56 control the machine recycle which is initiated at the end of the welding cycle at 0 rpm.

The reference voltage mechanisms 62 and the associated amplifier 60 control the motor shutoff or disconnect and the application of the initial ram axial thrust pressure. Reference voltage mechanism 64 and comparator 58 control the increased or second-stage pressure application in a two-step pressure system. The exact desired speed at which the motor of the welding machine is to be shut off or disconnected is preset on the reference voltage device 62 by turning a dial which indicates rpm. Setting of the reference voltage actually presets a particular voltage which corresponds to that rpm which will produce a voltage equal to the setting. Therefore, when the signal 54 coming from the filter integrator passes the preset reference voltage corresponding to a desired rpm, the comparator amplifier activates relay 68 which, in turn, activates the relay located in the machine logic and controls which control the motor of the inertia welding machine as will be hereinafter described.

As previously mentioned, the initial ram pressure is applied at the same time that the motor is shut off or disconnected. This, of course, can be accomplished with the subject switch assembly because there is no appreciable time lag between the signal which is monitored and the actual spindle speed. With reference to the simulated curve 10 of FIG. 1, utilization of this system will allow the motor to be disconnected and the initial ram pressure to be exerted at point 16.

Since the reference voltage mechanism 64 is identical to the mechanism 62, the setting of this reference voltage may be performed in the same manner as previously described. When the signal 52 coming from the filter integrator passes the value of the preset reference voltage on device 64, then comparator amplifier 58 will cause relay 70 to be activated, which, in turn, activates the relay located in the machine logic and controls which control the application of increased pressure to the weld piece in the welding machine, as will be hereinafter described.

Referring again to FIG. 1, it is shown that, in the simulated case, relay system 70 will be actuated by amplifier 58 as signal 52 exceeds the value preset in the mechanism 64, which setting corresponds to point 28 on trace 10. Although the amplifier 58 would normally be triggered on both the upside (increasing speed) and the downside (decreasing speed) of trace 10, a relay logic is built into the machine which prevents the machine ram from operating except on the downside of the curve. The structure and operation of the relay logic are as follows.

Turning to FIG. 3, there is shown in greater detail the circuitry of the instant invention. All relays shown reflect their state when the machine is at zero speed. It may be noted in passing that the dotted lines 74 correspond with the like-numbered machine logic and controls box shown in FIG. 2.

The operation of the device in going through a cycle is as follows. A "start cycle" push button switch 76 is manually actuated into closed position. When this occurs, a circuit is completed from bus bar 78 across switch 76 and normally closed relay contact 68a of relay 68 to control relay 80 and thence to bus bar 82. Bus bars 78 and 82 are conventionally positioned across a power source (not shown). Upon energizing control relay 80, its normally-open contact 80a closes which allows start-cycle button to be released. Completion of the circuit energized the machine motor by circuitry (not shown) and causes the machine to accelerate.

As the machine accelerates, magnetic pickup 32 senses a signal which is fed through squaring amplifier 34, differentiator 36, monostable multivibrator 38 and filter integrator 40, as aforementioned. The DC voltage signal 48, which is directly proportional to machine speed, is directed to the input sides of the three comparator amplifiers 56, 58 and 60. These comparator amplifiers will produce an output signal capable of energizing associated relays only when the voltage signal input to the amplifiers is greater than the signals input from their respective reference voltage sources 66, 64 and 60.

As machine speed increases, a voltage signal is present at the output of comparator amplifier 56 due to the fact that the machine speed exceeds the zero reference voltage speed set by means of fixed reference voltage 66. This output voltage would energize relay 72 and cause normally closed relay contacts 72a to open, except for the fact that relay contacts 70a and 72a are in their normally open state, thus preventing the output voltage from reaching relay 72 and the consequent completion of a circuit across relay 72. Thus, the relay logic effectively blocks out the operation of the recycle relay 72 when machine speed is increasing.

When the machine reaches upset speed as set by the digivider/digidecade switches of reference voltage 64, comparator amplifier 58 produces an output signal which energizes relay 70 through normally closed contacts 72b. This causes normally open contacts 70a and 70b to close and normally closed contacts 70c to open. The closing of contacts 70b, which are in parallel with contacts 72b, form a second path for the output signal of amplifier 58 to reach relay 70.

When control relay 70 becomes energized, normally open contacts 70a close and a circuit is completed across control relay 72, thus energizing the latter relay. The energizing of relay 72 causes its normally open contacts 72a, which are in parallel with contacts 70a, to become closed. Such energizing also causes normally closed contacts 72b, which are in parallel with contacts 70b, to become open. Thus, the relay logic primes the relays 70, 72 for second stage ram application and zero speed machine recycling while the machine speed is increasing and these relays cannot energize their respective relays in the machine logic and controls until after relay 68 has been energized and contacts 68b close. This occurs only on the decreasing speed or downside of the machine speed curve.

When the machine reaches the desired weld speed as preset by digivider/digidecade switches 62, a voltage signal is output from comparator amplifier 60 to relay 68. Energizing of relay 68 causes normally open contacts 68b to close and weld speed control relay 84 to be energized by means of the circuit completed from bus bar 78 through contacts 90a and relay contacts 68b to bus bar 82. This, in turn, closes normally open contacts 84a, 84b and 84c which are controlled by relay 84. Energizing of weld speed control relay 84 turns off the machine and causes first-stage ram pressure application through conventional circuitry (not shown).

As machine speed falls, signal 54 input to comparator amplifier 60 drops off and relay 68 is de-energized thus opening contacts 68b. Control relay 84 remains energized, however, since contact 84a remains closed thus preserving the circuit across relay 84.

As machine speed falls off further, signal 52 input to comparator amplifier 58 drops off and relay 70 is de-energized, thus completing the circuit from bus bar 78 through contacts 84b and 70c and upset speed control relay 86 to bus bar 82. Energizing of upset speed control relay 86 causes second-stage ram pressure application through conventional circuitry (not shown).

Simultaneously with the de-energizing of relay 70, contacts 70a and 70b return to their normally open state which, since relay 72 is still energized, effectively precludes re-energizing of relay 70. This is so since contact 72b remains open due to the continued energization of relay 72 and since contact 70b has returned to its normally open position.

De-energizing of relay 70 also causes contacts 70a associated with relay 72 to return to their normally open position. Thus, when machine speed falls to zero and an essentially zero signal 50 is input to comparator amplifier 56, relay 72 is de-energized. De-energizing relay 72 causes contacts 72a to open and 72b to close. Since contacts 70a are already open, the opening of contacts 72a precludes re-energization of relay 72 until a new cycle takes place.

Since contacts 84c are closed at this point in time, a circuit is completed from bus bar 74 across zero speed control relay 88 by way of now-closed relay contacts 72c to bus bar 82. This causes relay 88 to close contact 88a to thus complete a circuit across weld-complete control relay 90, which, in turn, opens contact 90a in the weld-complete control relay circuit. Opening of contact 90a causes weld speed control relay 84 to de-energize, which, in turn, causes contacts 84a, 84b and 84c to open. This, in turn, interrupts the circuits for control relays 86, 88 and 90, whereupon the machine is set for the next cycle which is initiated by manually actuating start-cycle, push-button switch 76, as aforementioned. It should be noted that the automatic recycling of the machine components thus described could include the deactuation of the hydraulic ram cylinders, unclamping either or both of the work-holding fixtures, or retracting of the tailstock fixture.

Although a power supply has not been shown in either of the diagrams, any standard design power source can be used to supply power to the different components of the speed switch assembly. The power supply can use standard 110-volt AC power which is converted to a ±12 and a 4-volt DC for operating the various components of the speed switch assembly.

In the schematic, the reference voltage mechanism 62 is shown in detail, having ten positions and five decades. This gives a possible value of from zero to 99,999 ohms to each of the reference voltage devices 62 and 64. Proper setting of the voltage devices will provide an output voltage proportional to the setting from each of them.

Thus, the Applicants have disclosed a speed switch and control assembly for use with devices having rotatable spindles in which machine functions are to be controlled in relation to spindle speed. Although the assembly has been disclosed in only one embodiment, many modifications thereto will be obvious to those skilled in the art without exceeding the purview of the following claims. For example, a potentiometer excited by a constant voltage source, a tape control output, or some similar apparatus could be substituted in place of the digivider/digidecade devices.

In the claims:

1. An apparatus for controlling machine functions in response to rotary speed of the machine comprising,
    sensing means situated so as to measure the speed of rotation of the machine,
    means creating a first, continuous speed signal in proportion to the sensed rotational speed;
    a plurality of actuating means, each of said actuating means comprising,
    reference means creating a second reference signal,
    comparator means for comparing said first speed signal with said reference signal, and
    relay means for controlling machine functions,
    said relay means being actuated by said comparator means when said first signal passes said second signal, and wherein a first one of said plurality of actuating means has
    a reference means creating a maximum speed reference signal corresponding to a maximum desired speed of the machine whereby said machine is shut down by actuation of the relay means in its actuating means when the value of said first speed signal passes the value of said maximum speed reference signal, and further including
    logic means for preventing actuation of the relay means in the other actuating means until after the maximum desired speed of the machine has been achieved.

2. The invention of claim 1 wherein a second one of said plurality of actuating means has a reference means creating a zero speed reference signal corresponding to essentially zero speed of the machine whereby said machine is recycled by actuation of the relay means in its actuating means when the value of said first speed signal passes the value of said zero speed reference signal.

3. The invention of claim 2 wherein a third one of said plurality of actuating means has an upset speed reference means creating an upset speed reference signal whereby a secondary upsetting pressure is applied by actuation of the relay means in its actuating means when the value of said first speed signal passes the value of said upset speed reference signal.

4. The invention of claim 3 wherein said logic means comprises a first relay contact in series with the relay means in said third one of said actuating means and a second relay contact in series with the relay means in the second one of said actuating means.

5. The invention of claim 4 wherein said logic means further comprises a third relay contact in parallel with said first relay contact and a fourth relay contact in parallel with said second relay contact.

6. The invention of claim 5 wherein said first, second and fourth relay contacts are of the normally open type and said third relay contacts are of the normally closed type.

7. The invention of claim 5 wherein said relay means in said third one of said actuating means controls said first and said fourth contacts and said relay means in said second one of said actuating means controls said second and said third contacts.

8. The invention of claim 1 wherein said sensing means comprises a magnetic pickup.

9. The invention of claim 1 wherein said maximum speed reference means is a variable type of device whereby the signal output therefrom may be variably adjusted.

10. The invention of claim 2 wherein said zero speed reference signal means is a nonvariable type of device whereby the signal output therefrom is fixed.

11. The invention of claim 5 wherein said upset speed reference means is a variable type of device whereby the signal output therefrom may be variably adjusted.

12. An apparatus for controlling machine functions in response to rotary speed of the machine comprising,
sensing means situated so as to measure the speed of rotation of the machine,
means creating a first, continuous speed signal in proportion to the sensed rotational speed,
a plurality of actuating means, each of said actuating means comprising,
reference means creating a second reference signal,
comparator means for comparing said first speed signal with said reference signal, and
relay means for controlling machine functions,
said relay means being actuated by said comparator means when said first signal passes said second signal, wherein said sensing means comprises
a magnetic pickup means for sensing the rotational speed of a rotating member of the machine and producing an output signal in the form of a sine wave,
squaring amplifier means for amplifying and converting the output signal from said magnetic pickup means into an output signal in the form of a square wave for each sine wave, and
differentiator means for differentiating said square wave signal into an output signal in the form of positive and negative pulses.

13. The invention of claim 12 wherein said sensing means further comprises monostable multivibrator means for converting said positive pulses into an output signal in the form of a square wave having a fixed width and height and sending said negative pulses to ground.

14. The invention of claim 13 further including filter integrator means for integrating the signal output from said monostable multivibrator means and converting it into said first speed signal as a function of the frequency of said signal output from said monostable multivibrator means.

15. The invention of claim 1 further including visual readout means for receiving said first speed signal for visual readout of the machine speed.

16. The invention of claim 15 wherein said visual readout means comprises a meter for visual readout of machine speed.

17. The invention of claim 16 wherein said visual readout means further comprises a meter range selector intermediate said filter integrator means and said meter.

18. The invention of claim 1 wherein at least one of said reference means is a variable type of device whereby the signal output therefrom may be variably adjusted.

19. The invention of claim 18 wherein said at least one reference means is a digivider/digidecade type of device whereby said reference signal may be variably adjusted.

20. The invention of claim 1 wherein at least one of said reference means is a nonvariable type of device whereby the signal output therefrom is fixed.

21. The invention of claim 1 wherein said first and second signals are voltage signals.

22. An apparatus for controlling machine functions in response to a parameter of the machine comprising,
sensing means situated so as to measure the machine parameter,
means creating a first continuous parameter signal in proportion to the sensed parameter,
a plurality of actuating means, each of said actuating means comprising,
reference means creating a second reference signal,
comparator means for comparing said first parameter signal with said reference signal, and
relay means for controlling machine functions,
said relay means being actuated by said comparator means when said first signal passes said second signal, wherein a first one of said plurality of actuating means has
a reference means creating a first reference signal whereby said machine is shut down by actuation of the relay means in its actuating means when the value of said first parameter signal passes the value of said first reference signal, and wherein a second one of said plurality of actuating means has
a reference means creating a second reference signal whereby a first machine function is actuated by actuation of the relay means in its actuating means when the value of said first parameter signal passes the value of said second reference signal, and further including
logic means for preventing actuation of the relay means in the latter actuating means until after actuation of the relay means in the former actuating means.

23. The invention of claim 22 wherein said logic means comprises a first relay contact in series with the relay means in said third one of said actuating means and a second relay contact in series with the relay means in the second one of said actuating means.

24. The invention of claim 23 wherein said logic means further comprises a third relay contact in parallel with said first relay contact and a fourth relay contact in parallel with said second relay contact.

25. The invention of claim 24 wherein said relay means in said third one of said actuating means controls said first and said fourth contacts and said relay means in said second one of said actuating means controls said second and said third contacts.

26. The invention of claim 24 wherein said first, second and fourth relay contacts are of the normally open type and said third relay contacts are of the normally closed type.

27. The invention of claim 24 wherein a third one of said plurality of actuating means has a reference means creating a third reference signal whereby a second machine function is actuated by actuation of the relay means in its actuating means when the value of the first parameter signal passes the value of said third reference signal.

* * * * *